Patented May 6, 1952

2,595,372

UNITED STATES PATENT OFFICE 2,595,372

N-METHYL-N-CINNAMYL-2-PHENYL-PROPYLAMINE

Robert S. Shelton, Mariemont, Ohio, assignor to The Wm. S. Merrell Company, Cincinnati, Ohio, a corporation of Delaware No Drawing. Application March 29, 1949, Serial No. 84,249

1 Claim. (Cl. 260—570.8)

This invention relates to a new chemical which is useful for the treatment of uterine conditions such as dysmenorrhea, as a coronary dilator and peripheral vasodilator. The compound has a relatively low toxicity, is a depressor agent, and when administered, produces relatively few and unpronounced side reactions.

The compound of the invention is N-methyl-N-cinnamyl-2-phenylpropylamine. It may be prepared from N-methyl-2-phenylpropylamine by reaction with cinnamaldehyde and formic acid or by reaction with cinnamyl chloride. The free base has a boiling point of 165 to 169° C./0.35 mm. and forms a crystalline hydrochloride with a melting point of 126 to 128° C. Its preparation will be illustrated by the following examples.

Example 1

A mixture of 187 grams of N-methyl-2-phenylpropylamine, 183 grams of cinnamaldehyde, and 208 grams of 98% formic acid was refluxed for 24 to 36 hours, poured into an excess of 10% aqueous sodium hydroxide and the resulting mixture was extracted with petroleum ether. The extract was fractionally distilled and the product collected at 160 to 163° C./0.3 mm.; $N_D^{25}$ 1.5635. Conversion to the hydrochloride gave a product which on recrystallization from ethyl acetate melted at 125–127° C.

Example 2

A mixture of 236 grams of cinnamyl alcohol and 1600 ml. of concentrated hydrochloric acid was distilled until the amount of oil that was being distilled was small. The distillate was extracted with about 250 ml. of 40 to 60° petroleum ether and the extract evaporated on the steam bath to constant weight. The crude cinnamyl chloride (140 grams) was heated on a steam bath with 440 grams of N-methyl-2-phenylpropylamine for about 3 days, stirred with 60 grams of potassium hydroxide in 200 ml. of water and extracted once with 500 ml. of petroleum ether. The extract was fractionally distilled and the fraction boiled at 165 to 169° C./0.35 mm., collected as N-methyl-N-cinnamyl-2-phenylpropylamine, $N_D^{25}$ 1.5620. It was converted to the hydrochloride and recrystallized 4 times from butanone giving a constant melting product with a melting point of 126 to 128° C. The melting point of the mixture of this with the product of Example 1 above was 126 to 128° C.

The product produced following the procedure of Example 1 has also been obtained with a melting point of 144 to 145° C., indicating the N-methyl - N - cinnamyl - 2 - phenylpropylamine probably is a polymorph. This higher melting product had the same pharmacological properties as the product described in the example.

The product in dilute solution relaxes isolated rabbit intestine under acetyl choline spasm and under barium chloride spasm, stimulates isolated rabbit uterine muscle in low concentration but relaxes it at higher concentration and inhibits pitressin stimulation. It relaxes the intestine in intact dogs and cats and has a slight depressant action on the intact uterus of normal dogs. It produces a depressor action on intravenous injection. Administered orally it produces little or no stimulation. It is useful therapeutically for the treatment of uterine disturbances, as a coronary dilator and peripheral vasodilator. It will ordinarily be administered orally although it is adapted for parenteral administration in the form of its hydrochloride or other acid addition salt. The invention includes the product in the form of the free base, or in the form of its salts.

I claim:

N-cinnamyl-N-methyl-2-phenylpropylamine.

ROBERT S. SHELTON.

REFERENCES CITED

The following references are of record in the file of this patent:

Braun et al.: "Ann.," vol. 436, pp. 299–320, (1924).

Blicke et al.: "J. Am. Chem. Soc.," vol. 61, pp. 774–776, (1939).